(12) United States Patent
Sclip et al.

(10) Patent No.: US 10,028,337 B2
(45) Date of Patent: Jul. 17, 2018

(54) HEATING DEVICE FOR DOMESTIC APPLIANCES WITH OPTICAL LIQUID-LEVEL SENSOR

(71) Applicant: ILLINOIS TOOL WORKS INC., Glenview, IL (US)

(72) Inventors: Marco Sclip, Sumirago (IT); Davide Bordignon, Travedona Monte (IT)

(73) Assignee: ILLINOIS TOOL WORKS INC., Glenview, IL (US)

( * ) Notice: Subject to any disclaimer, the term of this patent is extended or adjusted under 35 U.S.C. 154(b) by 278 days.

(21) Appl. No.: 14/411,923

(22) PCT Filed: Jul. 3, 2013

(86) PCT No.: PCT/US2013/049397
§ 371 (c)(1),
(2) Date: Dec. 30, 2014

(87) PCT Pub. No.: WO2014/008442
PCT Pub. Date: Jan. 9, 2014

(65) Prior Publication Data
US 2015/0201466 A1    Jul. 16, 2015

(30) Foreign Application Priority Data

Jul. 6, 2012    (IT) .............................. TO2012A0598

(51) Int. Cl.
*H05B 1/00* (2006.01)
*H05B 3/78* (2006.01)
(Continued)

(52) U.S. Cl.
CPC ............ *H05B 3/78* (2013.01); *A47L 15/4285* (2013.01); *D06F 39/004* (2013.01); *D06F 39/04* (2013.01);
(Continued)

(58) Field of Classification Search
CPC ... H05B 3/82; H05B 3/04; H05B 3/06; H05B 1/02; H05B 3/78; H05B 1/0252;
(Continued)

(56) References Cited

U.S. PATENT DOCUMENTS 3,694,085 A * 9/1972 Rich .................... G01N 15/065
                                                       250/574
4,132,899 A * 1/1979 Shigemasa .......... G01F 23/2925
                                                       250/577
(Continued)

FOREIGN PATENT DOCUMENTS

CN         1576823 A    2/2005
CN         2882479 Y    3/2007
(Continued)

OTHER PUBLICATIONS

ISR and WO for PCT/US2013/049397 dated Dec. 17, 2013.

*Primary Examiner* — Tu B Hoang
*Assistant Examiner* — Masahiko Muranami
(74) *Attorney, Agent, or Firm* — Hauptman Ham, LLP

(57) ABSTRACT

Heating device for domestic appliances comprising a base, a coil resistor extending from said base, and an optical sensor able to determine the level of washing liquid around said coil resistor.

11 Claims, 4 Drawing Sheets

(51) Int. Cl.
  *D06F 39/00* (2006.01)
  *H05B 1/02* (2006.01)
  *H05B 3/42* (2006.01)
  *G01F 23/292* (2006.01)
  *A47L 15/42* (2006.01)
  *D06F 39/04* (2006.01)
  *H05B 33/08* (2006.01)
  *A47L 15/00* (2006.01)

(52) U.S. Cl.
  CPC .......... *D06F 39/045* (2013.01); *G01F 23/292* (2013.01); *G01F 23/2922* (2013.01); *H05B 1/0252* (2013.01); *H05B 3/42* (2013.01); *H05B 33/0803* (2013.01); *A47L 15/0049* (2013.01); *A47L 2401/09* (2013.01); *A47L 2401/12* (2013.01); *A47L 2401/30* (2013.01); *A47L 2501/06* (2013.01); *H05B 2203/021* (2013.01)

(58) Field of Classification Search
  CPC ... H05B 3/42; H05B 33/0803; A47L 15/4285; A47L 15/4297; A47L 15/0049; A47L 2401/12; A47L 2401/30; A47L 2501/06; D06F 2202/04; D06F 2204/04; D06F 39/04; D06F 39/004; D06F 39/045; H01L 2924/0002; H01L 2924/00; H01L 23/48; H01L 25/16; H01L 2924/3011; H01L 31/03921; H01L 31/0445; G01N 2030/0035; G01N 30/02; G01N 2013/0241; G01N 27/60; G01N 30/64; F24H 9/0042; F24H 9/0047; F24H 9/2028; Y02B 40/56; A47K 3/10; G01F 23/292; G01F 23/2922
  USPC .......... 137/341, 399; 122/13.01; 385/66; 398/138; 392/485, 488, 497, 441, 447, 392/451; 219/201, 254, 437, 446.1, 219/441.1, 467.1, 523, 516, 502, 209; 68/3 R, 235 R; 236/21 R, 21 B; 356/442, 356/132; 359/605, 606
  See application file for complete search history.

(56) References Cited

U.S. PATENT DOCUMENTS

| | | | | |
|---|---|---|---|---|
| 4,619,530 | A * | 10/1986 | Meserol | G01N 21/255 356/246 |
| 4,757,699 | A * | 7/1988 | Arreghini | D06F 25/00 219/400 |
| 5,200,607 | A * | 4/1993 | Klima | G01J 1/02 250/216 |
| 5,444,531 | A * | 8/1995 | Foreman | A47L 15/4287 356/339 |
| 6,771,373 | B2 * | 8/2004 | Schenkl | A47L 15/4297 356/442 |
| 7,259,383 | B2 * | 8/2007 | Wirthlin | G01F 23/2925 250/227.11 |
| 7,305,178 | B2 * | 12/2007 | Haubold | F02M 31/125 392/441 |
| 7,613,385 | B2 * | 11/2009 | Muenzner | A47L 15/4285 392/485 |
| 7,777,159 | B2 * | 8/2010 | Ho | A47J 27/21041 219/441 |
| 2003/0010113 | A1 * | 1/2003 | Rosenbauer | D06F 39/087 73/290 R |
| 2003/0142316 | A1 | 7/2003 | Schenkl et al. | |
| 2005/0236592 | A1 | 10/2005 | Wirthlin | |
| 2006/0006108 | A1 * | 1/2006 | Arias | H01M 8/04208 210/232 |
| 2006/0191496 | A1 | 8/2006 | Muenzner et al. | |
| 2007/0026380 | A1 * | 2/2007 | Johnson | B01D 61/18 435/4 |
| 2007/0210107 | A1 | 9/2007 | Pleschinger et al. | |
| 2008/0028512 | A1 * | 2/2008 | Hughson | F24H 9/2028 4/541.3 |
| 2010/0281625 | A1 * | 11/2010 | Oh | D06F 35/006 8/137 |
| 2011/0083504 | A1 | 4/2011 | Unger | |
| 2011/0310927 | A1 | 12/2011 | Bombardieri et al. | |
| 2012/0001099 | A1 | 1/2012 | Schenkl et al. | |

FOREIGN PATENT DOCUMENTS

| | | |
|---|---|---|
| CN | 102042859 A | 5/2011 |
| CN | 102313736 A | 1/2012 |
| EP | 0787848 A1 | 8/1997 |
| EP | 1245713 A1 | 10/2002 |
| EP | 1335060 A1 | 8/2003 |
| EP | 1690971 A2 | 8/2006 |
| EP | 1816899 A2 | 8/2007 |

\* cited by examiner

HEATING DEVICE FOR DOMESTIC APPLIANCES WITH OPTICAL LIQUID-LEVEL SENSOR

RELATED APPLICATIONS

The present application is a National Phase of International Application Number PCT/US2013/049397 filed Jul. 3, 2013, and claims priority to Italian Application Number TO2012A000598 filed Jul. 6, 2012.

FIELD OF THE INVENTION

The present invention relates to domestic washing appliances, such as washing machines and dishwashers, and concerns a heating device for such domestic appliances that can heat the washing liquid.

DESCRIPTION OF THE RELATED ART

Washing machines and dishwashers are commonly fitted with a resistance heating device for heating the washing liquid. Such domestic appliances are normally fitted with a pressure switch to measure the level of the bath of washing liquid. Domestic washing appliances are commonly fitted with a heating device with a coil resistor that is immersed in the bath of washing liquid. A temperature sensor is also provided to measure the temperature of the bath and to cut off the power to the heating resistor once the bath reaches the preset working temperature.

If the pressure switch measuring the level of the liquid fails, the bath of washing liquid could leave the heating resistor uncovered. In this case, the resistor would quickly reach a high temperature that could damage the heating device. To overcome this drawback, it has already been proposed to incorporate a temperature sensor in the heating device such as to cut off the power supply to the heating device in the event of excessive temperature increases. However, the temperature sensor may not be able to prevent damage caused by the overheating of the heating resistor.

SCOPE AND SUMMARY OF THE INVENTION

The present invention is intended to provide a heating device for domestic appliances that provides greater safety guarantees against the risk of overheating.

According to the present invention, this objective is achieved by a heating device having the features set out in claim 1.

The claims are an integral part of the teaching provided in relation to the invention.

SHORT DESCRIPTION OF THE DRAWINGS

The present invention is described in detail below with reference to the attached drawings, which are provided purely by way of non-limiting example, in which.

DESCRIPTION OF EMBODIMENTS OF THE INVENTION

Figure 1:
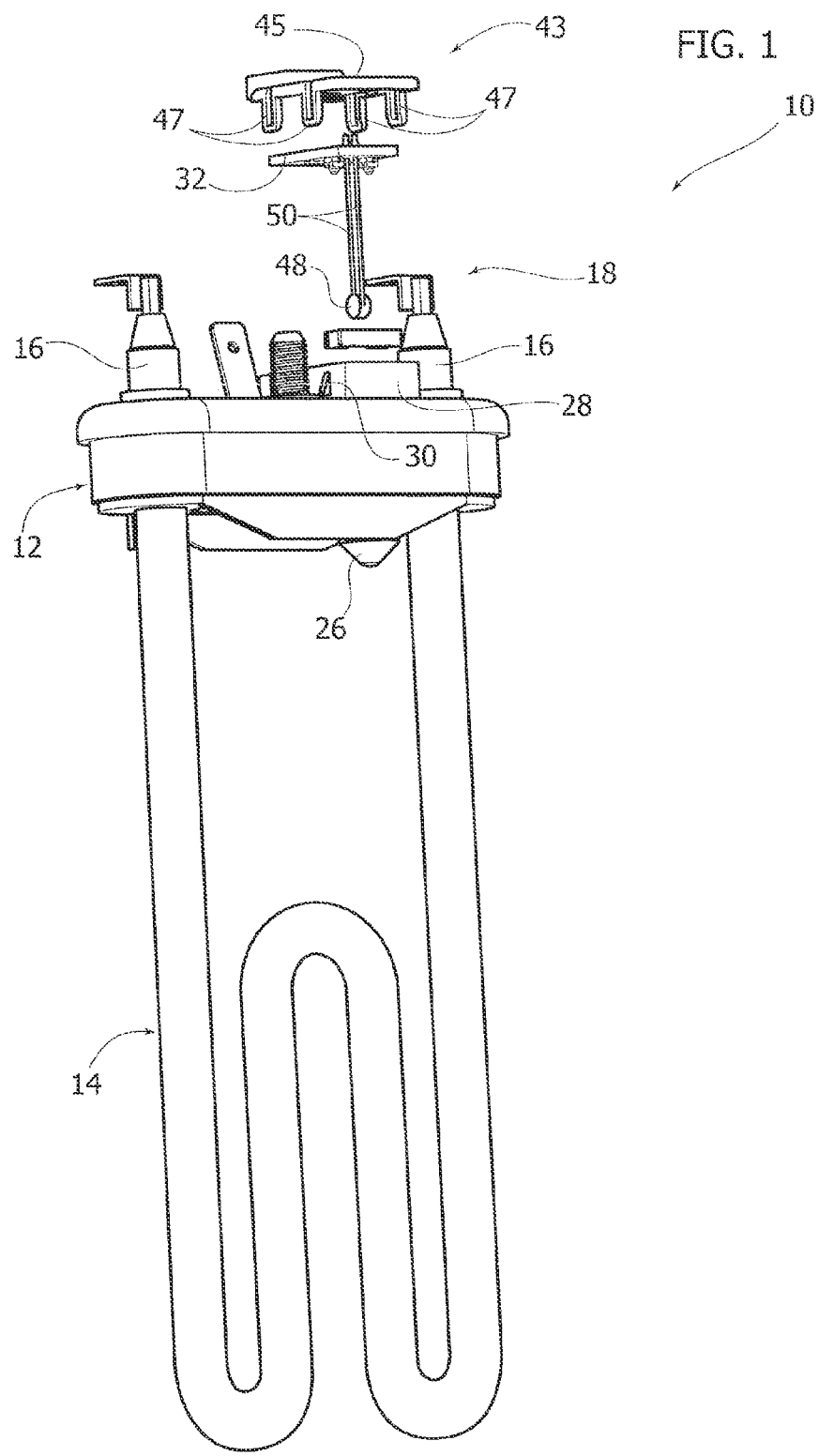
FIG. 1 is a partially exploded perspective view of a heating device for domestic appliances according to the present invention.
Figure 2:
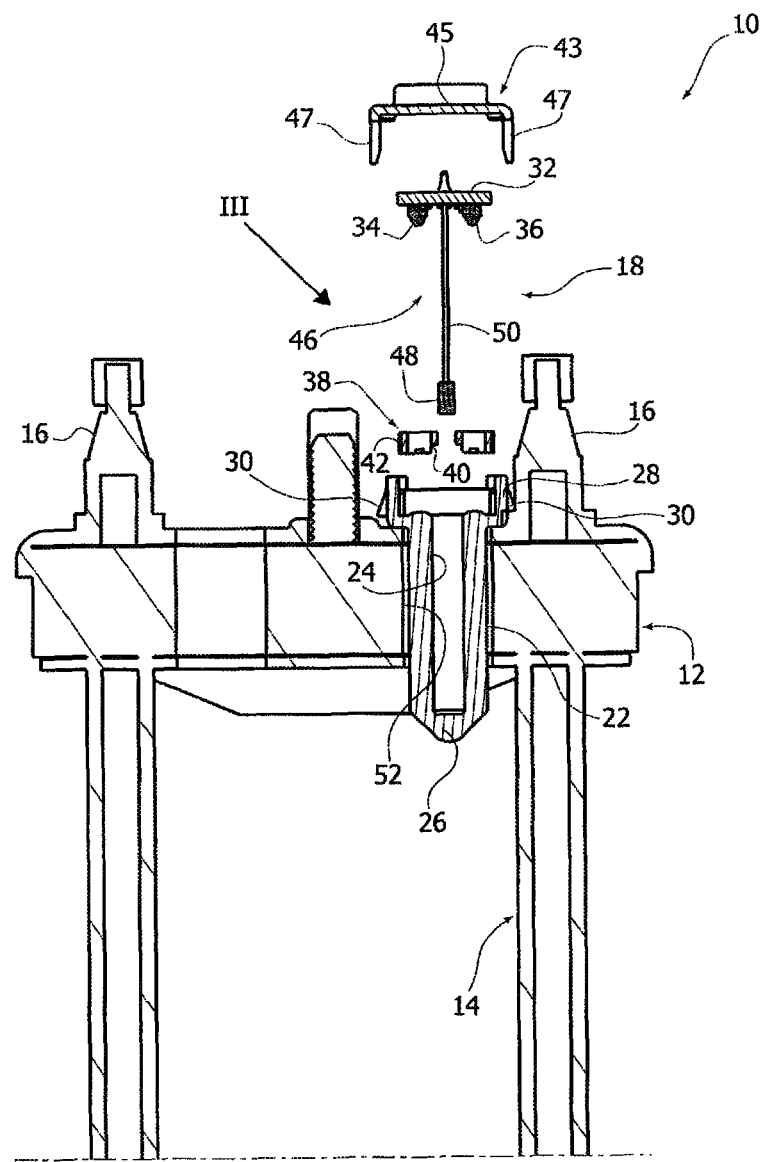
FIG. 2 is a partially exploded axial cross-section of the heating device in FIG. 1.

In FIGS. 1 and 2, reference sign 10 indicates a resistance heating device for domestic washing appliances, such as washing machines or dishwashers.

The heating device 10 includes a base 12 bearing a coil resistor 14. The extremities of the coil heater 14 are attached to the base 12 and are connected electrically to two terminals 16 that protrude from the base 12 on the side opposite the coil resistor 14.

The heating device 10 includes an optical sensor 18 on the base 12. The optical sensor 18 is able to determine the liquid level around the heating device 10.

Figure 3:
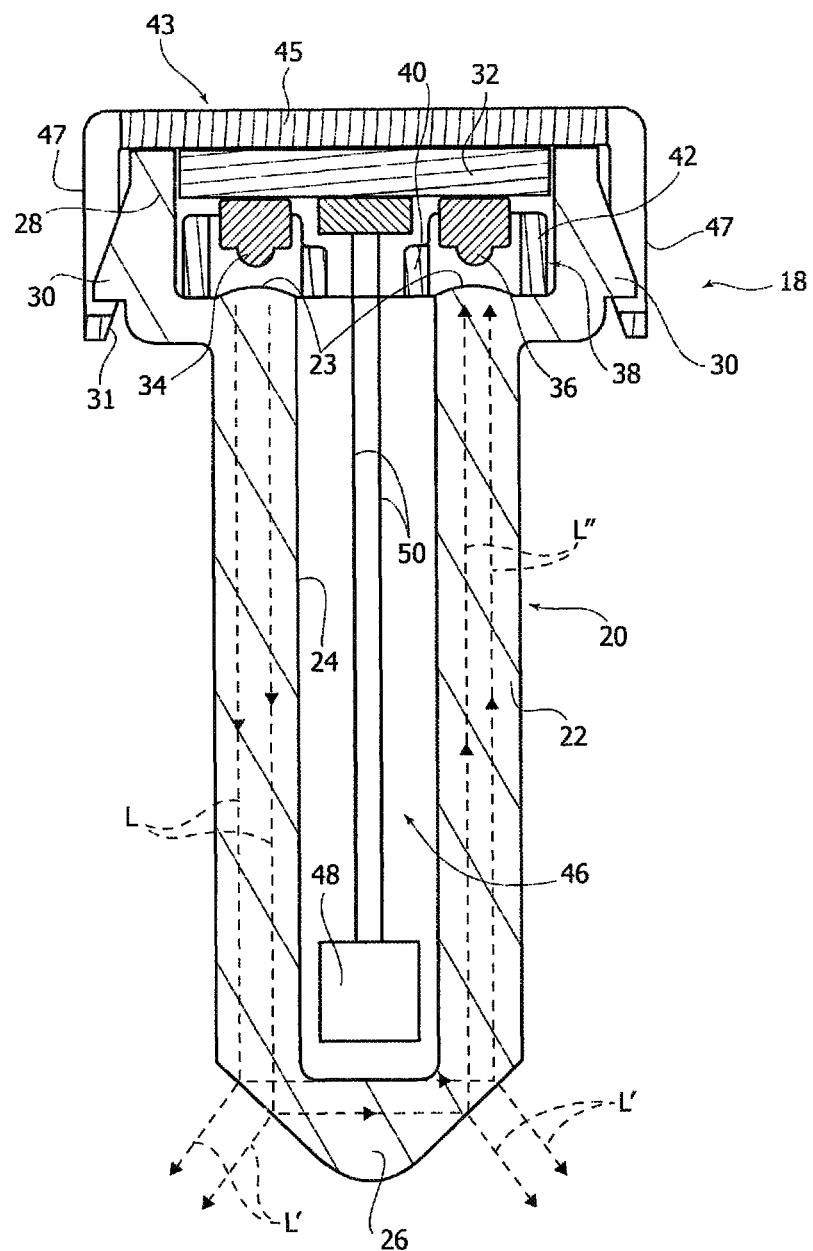
FIG. 3 is an axial cross-section of the optical sensor indicated by the arrow III in FIG. 2.
Figure 4:
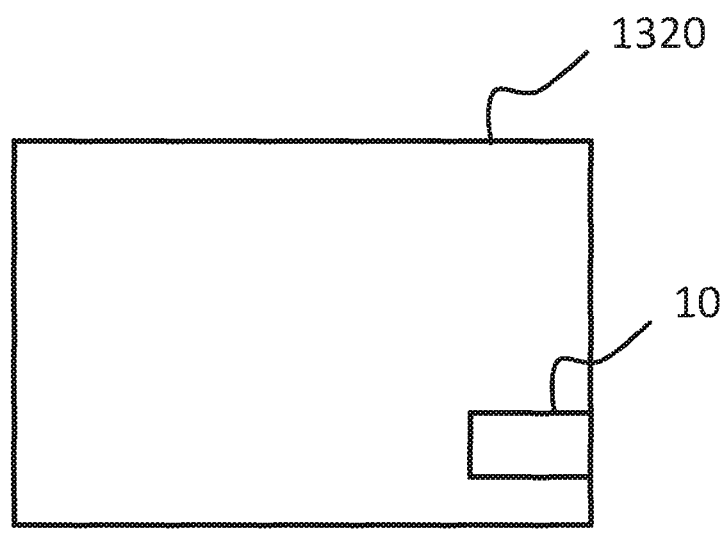
FIG. 4 depicts an exemplary domestic washing appliance 1320 in black-box format, including the heating device 10.

With reference to FIG. 3, the optical sensor 18 is preferably a reflection sensor and includes a waveguide 20 formed by an elongated hollow body 22 made of transparent plastic material, such as polycarbonate. The body 22 has an elongated cavity 24 and a substantially conical closed extremity 26. The body 22 has an enlarged head 28 with teeth 30 on the outside thereof. The body 22 has a cylindrical central section between the head 28 and the extremity 26, with a wall of constant thickness.

The optical sensor 18 includes a printed circuit board 32 bearing a light emitter 34 and a light receiver 36. The front of the light emitter 34 and the front of the light receiver 36 face the walls of the body 22 and are diametrically opposite one another. Preferably, the body 22 includes two lenses 23 (FIG. 3) arranged in front of the light emitter 34 and of the light receiver 36, to collimate the light emitted by the light emitter 34 and to focus the light reflected by the light guide 20 on the light receiver 36. Preferably, the lenses 23 are formed entirely on the body 22 by varying the profile of the front surface of the body 22.

The light emitter 34 and the light receiver 36 are optically separated from one another by a screen 38 with an internal annular wall 40 and an external annular wall 42. The internal annular wall 40 optically isolates the light emitter 34 from the light receiver 36. The external annular wall 42 optically isolates the light emitter 34 and the light receiver 36 from the side walls of the head 28.

The printed circuit board 32 is attached to the body 20 by means of a cover 43 with a base wall 45 that bears against the printed circuit board 32 and a plurality of arms 47 that clip onto the teeth 30 of the body 22.

The optical sensor 18 may have an integrated temperature sensor 46. The temperature sensor 46 includes an NTC resistor 48 seated in the cavity 24 near to the closed extremity 26. The NTC resistor 48 is connected to the printed circuit board 32 by means of terminals 50. The cavity 24 may be filled with a material having high thermal conductivity to encourage the transmission of heat between the walls of the body 22 and the NTC resistor 48.

With reference to FIG. 2, the body 22 of the optical sensor 18 is inserted and attached in a hole 52 in the base 12. The extremity 26 of the body 22 protrudes from the base 12 on the same side as the coil resistor 14. The head 28 of the body 22 protrudes from the base 12 on the same side as the terminals 16. The sensor 18 is connected by a connector (not shown) to a power and control circuit of the domestic appliance.

In operation, the light emitter 34 emits a luminous flux L that is propagated in the wall of the body 22 as shown in FIG. 3. A first part L' of the luminous flux is dispersed outside the luminous body 22 through the inclined walls of the conical extremity 26. A second part of the luminous flux L" is reflected inside the body 22 and reaches the light receiver 36. The part of the optical flux L' dispersed outside the body 22 depends on the ratio between the refraction coefficients between the material used for the body 22 and the material surrounding the body 22. The amount of the flux L' dispersed varies depending on whether the extremity 26 is surrounded by air or by washing liquid. The amount of the flux L' dispersed also depends on the level of the washing liquid around the body 22. The light receiver 36 receives the reflected flux L" and provides an electrical signal indicating the intensity of the reflected flux L". Since the intensity of the flux L" varies as a function of the level of liquid around the extremity 26, the sensor 18 is therefore able to provide precise information regarding the level of the washing liquid around the coil resistor 14. The information provided by the level sensor 18 helps to prevent damage being caused to the heating device 10 by overheating in the event of an erroneous level measurement by the pressure switch. The sensor 18 also provides, by means of the temperature sensor 46, a measurement of the temperature of the washing liquid which is used to cut the power to the heating device 10 when the preset temperature is reached.

Naturally, notwithstanding the principle of the invention, the design details and embodiments may be varied significantly from the description and illustrations without thereby moving outside the scope of the invention as defined in the claims below.

The invention claimed is:

1. A heating device for heating liquid in domestic appliances, comprising:
a base;
a coil resistor that extends from said base;
an optical sensor configured to determine a level of the liquid around said coil resistor, wherein the optical sensor includes a light guide formed of a transparent plastic elongated body inserted into a hole in said base; and
a temperature sensor seated in a cavity of said elongated body, wherein
said optical sensor further includes a light emitter and light receiver frontally facing a wall of said elongated body and optically isolated from one another, wherein said elongated body has a substantially conical extremity that protrudes from said base on the same side as said coil resistor and two lenses arranged opposite the light emitter and the light receiver.

2. The device as claimed in claim 1, wherein said optical sensor includes a printed circuit board bearing the light emitter and the light receiver.

3. The device as claimed in claim 2, wherein said temperature sensor includes a negative temperature coefficient resistor arranged to coincide with a closed extremity of said cavity and connected to said printed circuit board by means of terminals.

4. The device as claimed in claim 1, wherein said lenses are formed entirely on the body by varying the profile of the front surface of the body.

5. A washing appliance, comprising:
the heating device of claim 1.

6. The device as claimed in claim 1, wherein the base has a first face that faces the coil resistor and a second face opposite the first face, wherein the first face extends normal to a longitudinal direction of extension of the coil resistor.

7. The device as claimed in claim 1, wherein the base has a first face that faces the coil resistor and a second face opposite the first face, wherein the first face extends along a plane that is normal to a longitudinal direction of extension of the coil resistor.

8. The device as claimed in claim 1, wherein extremities of the coil resistor are attached to the base and are connected electrically to two terminals that protrude from the base on a side of the base opposite the coil resistor.

9. The device as claimed in claim 1, wherein the coil resistor extends in a longitudinal direction away from the base.

10. The device as claimed in claim 1, wherein the base has a first face that faces the coil resistor and a second face opposite the first face, wherein the first face extends normal to a longitudinal direction of extension of the coil resistor.

11. The device as claimed in claim 1, wherein the coil resistor is electrically connected to two terminals that protrude from the base on a side opposite the coil resistor such that the base is a barrier structure between a most distal end of the coil resistor relative to the base and respective most distal ends of the terminals relative to the base.

* * * * *